United States Patent [19]

Tsukahara et al.

[11] Patent Number: 5,266,673
[45] Date of Patent: Nov. 30, 1993

[54] PROCESS FOR PRODUCING A HYDROXY-SUBSTITUTED POLY(PHENYLENE ETHER) RESIN

[75] Inventors: Toru Tsukahara; Hiromi Nishimura; Mitsutoshi Aritomi; Yusuke Arashiro; Shinichi Yamauchi, all of Mie, Japan

[73] Assignee: Mitsubishi Petrochemical Co., Ltd., Tokyo, Japan

[21] Appl. No.: 883,682

[22] Filed: May 15, 1992

[30] Foreign Application Priority Data

Sep. 3, 1991 [JP] Japan .................................. 3-223020
Nov. 14, 1991 [JP] Japan .................................. 3-325045
Dec. 25, 1991 [JP] Japan .................................. 3-342585

[51] Int. Cl.$^5$ ............................................. C08G 65/38
[52] U.S. Cl. .................................... 528/212; 525/390;
525/419; 525/420; 525/437; 525/537; 526/313;
528/205; 528/210; 528/214; 528/215; 528/216;
528/217; 528/218; 528/219
[58] Field of Search ............... 528/212, 214, 215, 216,
528/217, 218, 219, 205, 210; 526/313

[56] References Cited

FOREIGN PATENT DOCUMENTS 0368413 5/1990 European Pat. Off. .
0382547 8/1990 European Pat. Off. .
3704899 8/1988 Fed. Rep. of Germany ...... 528/212
1550846 11/1968 France .

OTHER PUBLICATIONS

Patent Abstracts of Japan, vol. 14, No. 202 (C-713) (4165), Apr. 25, 1990, & JP-A-2 43234, Feb. 13, 1990, Masaji Yoshimura, et al., "Thermoplastic Resin Composition".
Patent Abstracts of Japan, vol. 14, No. 220 (C-717) (4163), May 10, 1990, & JP-A-2 51 555, Feb. 21, 1990, Masso Nishiyama, et al., "Thermoplastic Resin Composition".

Primary Examiner—Harold D. Anderson
Attorney, Agent, or Firm—Oblon, Spivak, McClelland, Maier & Neustadt

[57] ABSTRACT

A hydroxy-substituted poly(phenylene ether) resin can be produced by copolymerizing from 1.5 to 8 mol % of a phenol compound selected from those represented by the following formulae (a), (b), (c), (d), and (e):

(a)

(b)

(c)

(d)

(e)

(Abstract continued on next page.)

ABSTRACT
and from 98.5 to 92 mol % of a phenol compound of the following formula (f):
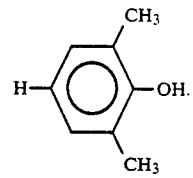
The hydroxy-substituted poly(phenylene ether) resin shows excellent compatibility with a polyamide, a polycarbonate, a poly(butylene terephthalate), a poly(phenylene sulfide), and is useful as a copatibilizer or a modified resin for engineering plastics.
3 Claims, 3 Drawing Sheets

PROCESS FOR PRODUCING A HYDROXY-SUBSTITUTED POLY(PHENYLENE ETHER) RESIN

FIELD OF THE INVENTION

The present invention relates to a process for producing a novel hydroxy-substituted poly(phenylene ether) resin and to a resin composition containing the resin.

BACKGROUND OF THE INVENTION

In recent years, engineering plastic materials have been used in increasingly diversified and sophisticated applications. In applications which require the blending of two or more non-compatible polymers, it can be effective to use a compatibilizer, such as a block or graft copolymer containing a segment having an affinity for each polymer to be blended, in order to obtain a formed article in which one polymer is in a very finely dispersed state and the continuous and dispersed phases are tenaciously bonded with each other. One important method for synthesizing such a compatibilizer would be to react functional group-containing polymers reactive with each other which could thereby bond to the non-compatible polymers. Thus, there is a strong desire to develop a resin which contains a reactive functional group.

It has been proposed to incorporate various functional groups into poly(phenylene ether)s by using a terminal phenolic hydroxyl group as a reaction site. For example, known modified poly(phenylene ether)s include a terminal-carboxylic anhydride-modified poly(phenylene ether) as disclosed in JP-A-63-199754 or JP-W-62-500456, a terminal-alcoholic hydroxyl-modified poly(phenylene ether) as disclosed in U.S. Pat. No. 4,746,708, and a terminal-glycidyl-modified poly(phenylene ether) as disclosed in U.S. Pat. No. 4,732,937. (The terms "JP-A" and "JP-W" as used herein mean an "unexamined published Japanese patent application" and "an unexamined published international application", respectively.) However, since the number of reaction sites and the number of functional groups per molecule of poly(phenylene ether) are at most one, none of these known polymers are acceptable for use as a compatibilizer.

On the other hand, U.S. Pat. No. 5,019,631 discloses a poly(phenylene ether) having a large number of functional groups per polymer chain. This poly(phenylene ether) is an amorphous modified poly(2,6-di-methyl-p-oxyphenylene), having a glass transition temperature of from 180° to 220° C., in which from 10 to 60%, on the average, of the polymer structural units comprise:

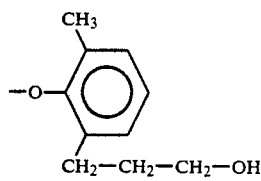

or

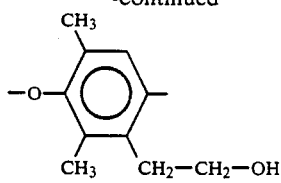

The above polymer is obtained by a process comprising: (a) metalating poly(2,6-dimethyl-p-oxyphenylene) with an alkaline metal in an inert solvent at a temperature from $-30°$ to $80°$ C. for about 1 minute to 4 hours where the alkaline metal is selected from the group consisting of an alkaline metal $C_1$–$C_{12}$-alkyl, an alkaline metal hydride, and an alkaline metal amide, with the molar ratio of the metalating agent to the poly(2,6-dimethyl-p-oxyphenylene) being from 0.1:1 to 1:1; (b) reacting the metalated poly(2,6-dimethyl-p-oxyphenylene) with ethylene oxide, in an amount at least equal to the amount of the alkaline metal in step (a), in an inert organic solvent at a temperature of from $-30°$ to $80°$ C. for about 5 minutes to 2 hours to form a modified poly(2,6-dimethyl-p-oxyphenylene); and (c) recovering the modified poly(2,6-dimethyl-p-oxyphenylene).

However, the above process has several disadvantages due to the high reactivities of the metalating agent used and the metalated poly(phenylene ether) formed during the process. Both can readily react with water, carbon dioxide, and other substances present in the reaction system. This reduces the activity of the metalating agent and causes its selectivity to be as low as 50% or less. Additionally, the recovery of the modified polymer is only about 70%. It is also difficult to control the amount of alcoholic hydroxyl groups incorporated into the polymer. Thus, from the standpoint of commercial production of the modified polymer, the above process has various problems which need to be overcome.

An effective method for incorporating a functional group is to copolymerize 2,6-dimethylphenol with a monomer compound having a functional group. However, in the known copolymers which can be included in the class of poly(phenylene ether)s the substituents on benzene rings in the backbone have been limited to alkyl groups, alkenyl groups, aromatic groups, halogens, and alkoxy groups.

Therefore, a process is needed which can provide a poly(phenylene ether) having a predetermined level of a reactive functional group.

SUMMARY OF THE INVENTION

Accordingly, one object of the present invention is to provide a process for producing a novel poly(phenylene ether) resin having in the molecule one or more reactive hydroxyl group(s).

Another object of the present invention is to provide a resin composition comprising a blend of the above hydroxy-substituted poly(phenylene ether) resin with another thermoplastic resin.

Still another object of the present invention is to provide articles formed from a hydroxy-substituted poly(phenylene ether) resin or resin composition which have excellent coatability, platability, bondability or printability, or provide an improved gas barrier.

A further object of the present invention is to provide a compatibilizer comprising a hydroxy-substituted poly(phenylene ether) resin, for compatibilizing two otherwise non-compatible polymers.

These and other objects and effects of the present invention have been satisfied by the discovery that a hydroxy-substituted poly(phenylene ether) resin having the above desired properties can be prepared by a process comprising copolymerizing from 0.01 to 100 mol % of at least one substituted phenol compound represented by general formula (I):

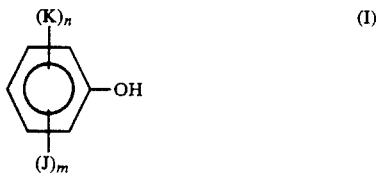

wherein m is an integer of 1 to 4 and n is an integer of 0 to 3, provided that $m+n \leq 4$; J represents a group of the formula $(HO)_a-R^1-$ where a is an integer of 1 to 6 and $R^1$ represents an aromatic polyvalent hydrocarbon group or an aliphatic polyvalent hydrocarbon group which has 1 to 20 carbon atoms and may contain an aromatic group, a halogen atom, or an ether group, provided that when m is 2 or a larger integer, J's may be the same or different; and K represents a halogen atom, a primary or secondary alkyl group having 1 to 20 carbon atoms, an alkenyl group having 2 to 20 carbon atoms, an aromatic group, an aminoalkyl group having 1 to 20 carbon atoms, a haloalkyl group having 1 to 20 carbon atoms, a halohydrocarbonoxy group having 1 to 20 carbon atoms, or an alkoxy group having 1 to 20 carbon atoms, provided that when n is 2 or a larger integer, K's may be the same or different, with from 99.99 to 0 mol % of at least one substituted phenol compound represented by general formula (II):

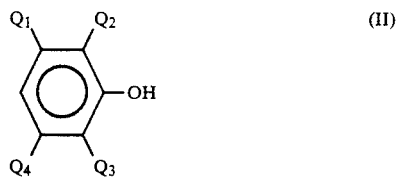

wherein $Q^1$, $Q^2$, $Q^3$, and $Q^4$ each independently represents a hydrogen atom, a halogen atom, a primary or secondary alkyl group having 1 to 20 carbon atoms, an alkenyl group having 2 to 20 carbon atoms, an aromatic group, an aminoalkyl group having 1 to 20 carbon atoms, a haloalkyl group having 1 to 20 carbon atoms, or an alkoxy or halohydrocarbonoxy group having 1 to 20 carbon atoms.

Formed articles obtained from the hydroxy-substituted poly(phenylene ether) resin are excellent in coatability, platability bondability, or printability and have improved gas barrier properties due to the hydroxyl groups contained in the polymer. Accordingly, the resin of the present invention is suited for use in printing films or automotive wheel parts to be plated. The hydroxy-substituted poly(phenylene ether) resin is also useful as a compatibilizer for polymer alloys comprising blends of a poly(phenylene ether) with another resin, such as a polyamide, a polyester, polycarbonate, or poly(phenylene sulfide).

DETAILED DESCRIPTION OF THE PREFERRED EMBODIMENTS

Figure 1:
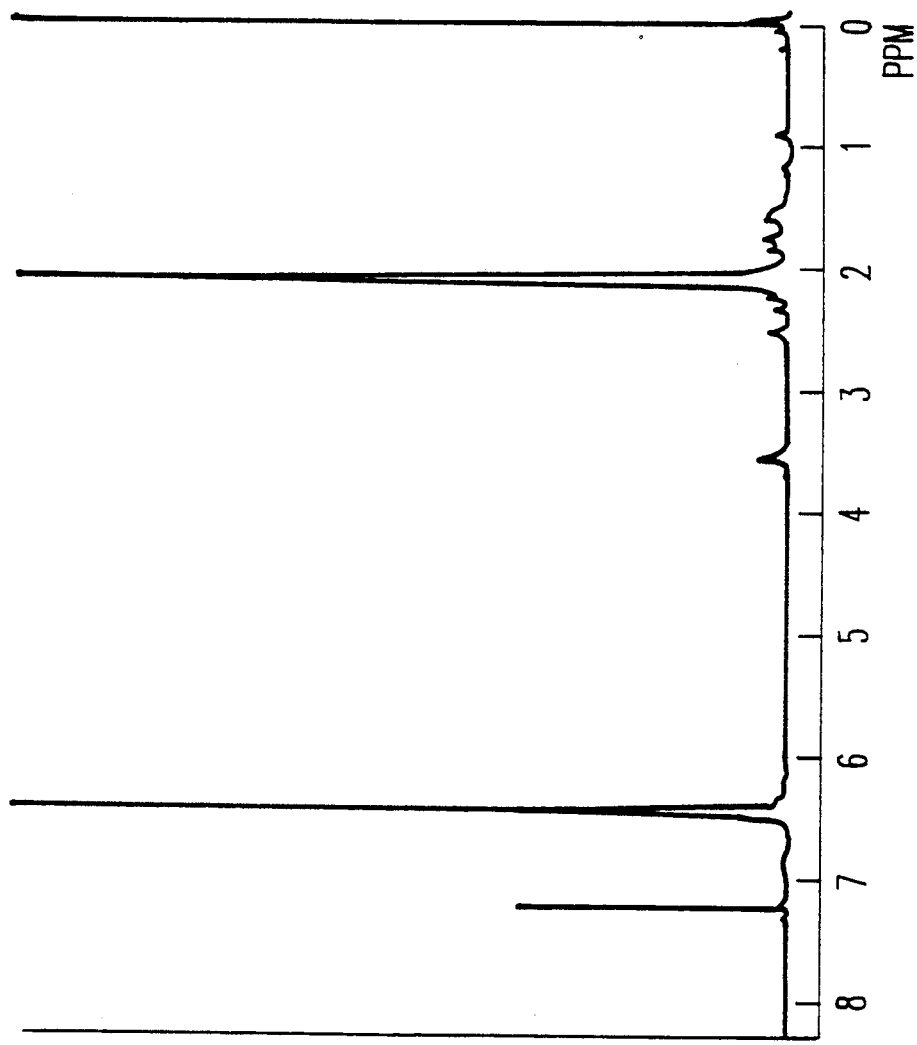
FIG. 1 is a $^1$H-NMR chart for the novel hydroxy-substituted poly(phenylene ether) obtained in Example 1.

In the process of the present invention, a substituted phenol compound represented by general formula (I) is used.

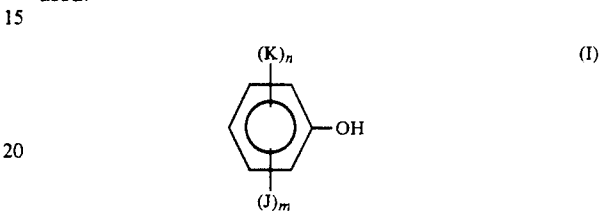

In the above formula, m is an integer of 1 to 4 and n is an integer of 0 to 3, provided that $m+n \leq 4$. J represents a group of the formula $(HO)_a-R^1-$ where a is an integer of 1 to 6 and $R$; represents an aromatic polyvalent hydrocarbon group or an aliphatic polyvalent hydrocarbon group which has 1 to 20 carbon atoms and may contain an aromatic group, a halogen atom, or an ether group, provided that when m is 2 or a larger integer, J's may be the same or different.

Further, K represents a halogen atom, a primary or secondary alkyl group having 1 to 20 carbon atoms, an alkenyl group having 2 to 20 carbon atoms, an aromatic group, an aminoalkyl group having 1 to 20 carbon atoms, a haloalkyl group having 1 to 20 carbon atoms, a halohydrocarbonoxy group having 1 to 20 carbon atoms, or an alkoxy group having 1 to 20 carbon atoms, provided that when n is 2 or a larger integer, K's may be the same or different.

Examples of substituent J may include hydroxymethyl, 1- or 2-hydroxyethyl, 1- to 3-hydroxypropyls, 1-to 4-hydroxybutyls, 1- to 5-hydroxypentyls, 1- to 6-hydroxyhexyls, 1- to 7-hydroxyheptyls, 1- to 8-hydroxyoctyls, 1- to 10-hydroxydecyls, 1- to 12 hydroxydodecyls, 1 to 14 hydroxytetradecyls, 1- to 16-hydroxyhexadecyls, 1- to 18-hydroxyoctadecyls, 1- to 20-methylethyl, dimethylhydroxymethyl, bis(hydroxymethyl)methyl, 2-hydroxy-1-ethylethyl, 2-hydroxy-1-methylpropyl, 3-hydroxy-1-methylpropyl, tris(hydroxymethyl)hydroxymethylpropyl, 3-hydroxy-1-hydroxymethyl, 2,3 -dihydroxy-1-hydroxymethylpropyl, 2,4- or 3,5-dihydroxypentyl, 3,4,5,6-tetrahydroxyheptyl, 2,3-dihydroxy-1-methylpropyl, 2- or 3-hydroxy-1,1-dimethylpropyl, 2,3-dihydroxy-1,1-dimethylpropyl, 2- or 3-hydroxy-1-methylbutyl, 2,3-dihydroxy-1-methylbutyl, 2- or 3-hydroxy-1,1-dimethylbutyl, 2,3-dihydroxy-1,1-dimethylbutyl, 2- or 3-hydroxy-3-methylbutyl, 2,3-dihydroxy-3-methylbutyl, 2 or 3-hydroxy-1,3-dimethylbutyl, 2,3-dihydroxy-1,3-di-dihydroxy-1,1,3-trimethylbutyl, 2- or 3-hydroxy-3-methylbutyl, 2,3-dihydroxy-3-methylbutyl, 2- or 3-hydroxy-1,3-dimethylbutyl, 2,3-dihydroxy-1,3-dimethylbutyl, 2- or 3-hydroxy-1,1,3-trimethylbutyl, 2,3-dihydroxy-1,1,3 trimethylbutyl, 2- or 3-hydroxy-2-methylpropyl, 2,3-dihydroxy-2-methylpropyl, 2- or 3-hydroxy-1,2-dimethylpropyl, 2,3-dihydroxy-1,2-dimethylpropyl, 2-or 3- hydroxy-1,1,2-trimethylpropyl, 2,3-dihydroxy-1,1,2-trimethylpropyl, 2- or 3-hydroxy-2-methylbutyl, 2,3-dihydroxy-2-methylbutyl, 2- or 3-hydroxy-2,3-dimethylbutyl, 2,3-dihydroxy-2,3-dimethylbutyl, 6- or 7-hydroxy-3,7-dimethyl-2-octenyl, 2- or 3-hydroxy-3,7-dimethyl-6'-octenyl, 3,7- or 2,6-dihydroxy-3,7-dimethyloctyl, 2,3,6,7-tetrahydroxy-3,7-dimethyloctyl, 2-(2-hydroxyethyloxy)ethyl, 2-(2,2-bis(hydroxymethyl)ethyloxy)ethyl, 2-(2,3-dihydroxypropyloxy)ethyl, 2-(2-hydroxy-1-methylethyloxy)ethyl, 2-(2-hydroxypropyloxy)ethyl, 2-(1-chloromethyl-2-hydroxyethyloxy)ethyl, 2-(1-chloro-2-hydroxypropyloxy)ethyl, 2-, 3-, or 4-hydroxyphenyl, 2,4-, 3,4-, or 2,3-dihydroxyphenyl, or 2,4,6-trihydroxyphenyl.

Examples of substituent K may include methyl, ethyl, n-propyl, n-butyl, n-amyl, isoamyl, 2-methylbutyl, n-hexyl, 2,3-dimethylbutyl, 2-, 3-, or 4-methylpentyl, heptyl, isopropyl, sec-butyl, methoxy, ethoxy, propoxy, phenoxy, 1-methylpentyl, phenyl, fluorine, chlorine, or bromine.

Among the possible examples of substituted phenol compound of general formula (I), preferred compounds are 2 (3-hydroxypropyl)-6-methylphenol, 2-(4-hydroxybutyl)-6-methylphenol, 2-(2,3-dihydroxypropyl)-6-methylphenol, 2-(3-hydroxy-2-methylpropyl)-6-methylphenol or 2-(1-ethyl-2-hydroxyethyl)-6-methylphenol. Compounds such as these may be obtained by conventional synthetic methods for organic compounds. For example, some of these compounds can be easily synthesized by hydroboration of the side chain olefinic double bonds (see, for example, H. C. Brown, Organoboranes in Organic Synthesis, Marcel Dekker (1973)).

Examples of the phenol-substituted compound of general formula (II) may include phenol, o-, or m-cresol, 2,6-, 2,5-, or 3,5-dimethylphenol, 2,6-diphenylphenol, 2,6-diethylphenol, 2,3,5- or 2,3,6-tri-methylphenol, 2-methyl-6-t-butylphenol, 2-allylphenol, 2,6-diallylphenol, 2-allyl-6-methylphenol, 2-allyl-5-chlorophenol, 2-allyl-3-methoxyphenol, 2-allyl-3-isobutyl-6-methylphenol, 2-allyl-6-ethylphenol, 2-geranyl-6-methylphenol, and 2,6-digeranylphenol. Of these, preferred examples include 2,6-dimethylphenol and a combination of a large proportion of 2,6-dimethylphenol with a small proportion of at least one monomer selected from 2,3,6-trimethylphenol, o-cresol, and further include 2,6-diallylphenol, 2-allyl-6-methylphenol, 2-allyl-6-ethylphenol, and 2-geranyl-6-methylphenol. Particularly preferred is 2,6-dimethylphenol.

In the copolymerization of the monomer compounds of general formulae (I) and (II), a small proportion of a polyhydroxy aromatic compound may be used as an additional monomer. Examples of the polyhydroxy aromatic compound include bisphenol A, tetrabromobisphenol A, hydroquinone, 2,2-bis(3',5'-dimethyl-4'-phenyl)methane, and 3,3',5,5'-tetramethyl-4,4'-dihydroxybiphenyl.

A suitable catalyst for the oxidative polymerization may include a cuprous salt-amine catalyst, cupric salt amine-alkali metal hydroxide catalyst, manganese salt-primary or secondary amine catalyst.

The hydroxy-substituted poly(phenylene ether) resin obtained by the process of the present invention, may be a homopolymer as represented by general formula (V), a block copolymer as represented by general formula (VI), or a random copolymer as represented by general formula (VI) which consists of x structural units represented by formula (VII) and y structural units represented by formula (VIII) in a random order.

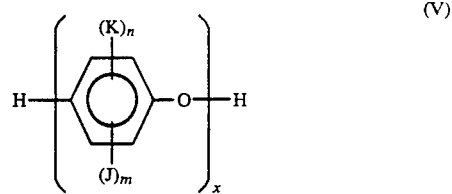

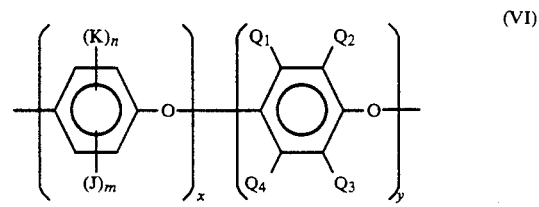

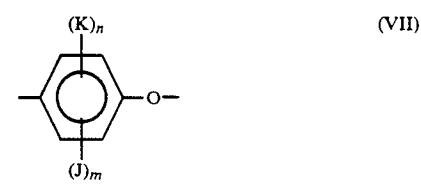

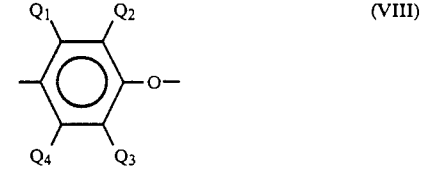

In the above formulae, m, n, J, K, $Q_1$, $Q_2$, $Q_3$ and $Q_4$ each has the same meaning as that in the formula (I) or (II)."

In the case where the hydroxy-substituted poly(phenylene ether) resin is a copolymer shown by formula (VI) and this copolymer is intended for use as a compatibilizer for polymer alloys, the mole proportion of the structural unit of formula (VII), i.e., $100 \, x/(x+y)$, should be 50 or less, preferably from 0.2 to 20, more preferably from 1.5 to 8. Due to the expense of the compound of formula (I), it is most preferable to use the lowest effective amount of the compound corresponding to the structural unit of formula (VII). The hydroxy substituted poly(phenylene ether) resin obtained by the process of the present invention may have a number-average degree of polymerization of from 25 to 400, corresponding to a number-average molecular weight of from 3,000 to 50,000. If the number-average degree of polymerization of the resin is below 25, the resin does not function well as a compatibilizer and products formed from the resin only do not have sufficient strength and heat resistance. If the degree of polymerization exceeds 400, injection molding or extrusion molding become difficult, due to the high melt viscosity of the resin.

In order to maximize resin productivity and compatibility with other resins, it is preferred that the hydroxy-substituted poly(phenylene ether) resin be a copolymer having from 1.5 to 8 mol % of a structural unit selected from those represented by the following formulae (a), (b), (c), (d), and (e):

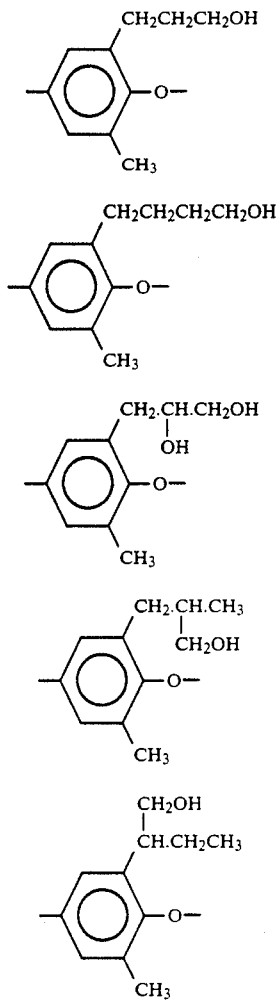

and from 98.5 to 92 mol % of a structural unit of the following formula (f):

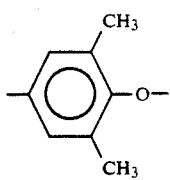

The hydroxy-substituted poly(phenylene ether) resin produced by the present invention may be used as a blending aide with a thermoplastic resin such as, a polyamide, saturated polyester, polycarbonate, or poly(phenylene sulfide). Preferably, from 10 to 90% by weight of the hydroxy-substituted poly(phenylene ether) resin (Component B) is blended with from 90 to 10% by weight of such a thermoplastic resin (Component A).

The polyamide to be blended with the hydroxy-substituted poly(phenylene ether) resin is a polymer which has an amide bond, —CONH—, in the polymer backbone and can be melted by heating. Representative examples include nylon-4, nylon-6, nylon-6,6, nylon-4,6, nylon-12, and nylon-6,10. Further, a low-crystalline or non-crystalline polyamide containing monomer units derived from an aromatic diamine and aromatic dicarboxylic acid or mixtures of such polyamides may also be used.

Preferred polyamides are nylon-6, nylon-6,6, and non-crystalline polyamides, all of which have a relative viscosity as measured at 25° C. in 98% sulfuric acid (JIS K-6810) of from 2.0 to 8.0.

As a saturated polyester to be blended with the hydroxy-substituted poly(phenylene ether) resin, various kinds of polyesters can be used, examples of which are thermoplastic polyesters produced by the condensation of a glycol with a dicarboxylic acid or its lower alkyl ester, acid halide, or anhydride derivative in a conventional manner.

Aromatic or aliphatic dicarboxylic acids suitable for producing such thermoplastic polyesters may include oxalic acid, malonic acid, succinic acid, glutaric acid, adipic acid, suberic acid, azelaic acid, sebacic acid, terephthalic acid, isophthalic acid, p,p'-dicarboxydiphenyl sulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid, 2,7-naphthalenedicarboxylic acid, or mixtures of these carboxylic acids.

Aliphatic diols suitable for producing such thermoplastic polyesters may include straight-chain alkylene glycols having from 2 to 12 carbon atoms, such as ethylene glycol, 1,3-trimethylenediol, 1,4-tetramethylenediol, 1,6-hexamethylenediol, or 1,12-dodecamethylenediol. Suitable aromatic diol compounds may include p-xylenediol, pyrocatechol, resorcinol, hydroquinone, or alkyl-substituted derivatives of these. In addition to these, 1,4-cyclohexanedimethanol may also be used as a suitable diol.

Other preferred polyesters for use in blends with the hydroxy-substituted poly(phenylene ether) resin of the present invention include polyesters produced by the ring-opening polymerization of lactones, such as polypivalolactone and poly(e-caprolactone), and thermotropic liquid crystalline polyesters (TLCP). The following representative TLCP polyesters are on the market: X 7G manufactured by Eastman Kodak Company; Xydar manufactured by Dartco Inc.; Econol manufactured by Sumitomo Chemical Co., Ltd.; and Vectola manufactured by Celanese Corp.

Of the above-enumerated polyesters, poly(ethylene terephthalate) (PET), poly(butylene terephthalate) (PBT), poly(naphthalene terephthalate) (PEN), poly(1,4-cyclohexanedimethylene terephthalate) (PCT), and liquid-crystal polyesters are particularly suitable for use as the saturated polyester in the thermoplastic resin composition of the present invention.

The polycarbonate to be blended with the hydroxy-substituted poly(phenylene ether) resin may be a thermoplastic aromatic polycarbonate which has been produced by reacting an aromatic dihydroxy compound, or a combination of this compound and a small proportion of a polyhydroxy compound, with either phosgene or a carbonic acid diester. The polycarbonate may be branched or unbranched. Preferred aromatic dihydroxy compounds include 2,2-bis(4-hydroxyphenyl)propane (bisphenol A), tetramethylbisphenol A, tetrabromobisphenol A, bis(4-hydroxyphenyl) p-diisopropylbenzene, hydroquinone, resorcinol, 4,4 -dihydroxydiphenyl, bis(4-hydroxyphenyl)methane, bis(4-hydroxyphenyl) ether, bis(4-hydroxyphenyl) sulfone, bis(4-hydroxyphenyl) sulfoxide, bis(4-hydroxyphenyl) sulfide, bis(4-hydroxyphenyl) ketone, 1,1-bis(4-hydroxyphenyl)e- thane, and 1,1-bis(4-hydroxyphenyl)cyclohexane. Particularly preferred of these is bisphenol A.

A branched aromatic polycarbonate resin may be obtained by replacing a portion of the above dihydroxy compound with a polyhydroxy compound, such as, phloroglucinol, 4,6-dimethyl-2,4,6-tri(4-hydroxyphenyl)heptene-2, 4,6-dimethyl-2,4,6-tri(4-hydroxyphenyl)heptane, 2,6-dimethyl-2,4,6-tri(4-hydroxyphenyl)heptene-3, 4,6-dimethyl-2,4,6-tri(4-hydroxyphenyl)heptane, 1,3,5-tri(4-hydroxyphenyl)benzene, 1,1,1-tri(4-hydroxyphenyl)ethane, 3,3-bis(4-hydroxyallyl)hydroxyindole [isatin(bisphenol)], 5-chloroisatin, 5,7-dichloroisatin, or 5-bromoisatin. Preferably, from 0.1 to 2 mol % of the dihydroxy compound is replaced by the polyhydroxy compound.

In producing the aromatic polycarbonate to be blended with the hydroxy-substituted poly(phenylene ether) resin, an aromatic monohydroxy compound may be used for molecular weight regulation. Preferred examples of the monohydroxy compound include m- or p-methylphenol, m- or p-propylphenol, p-bromophenol, p-tert-butylphenol, and p-(long-chain alkyl)-phenols. Representative examples of the aromatic polycarbonate resin include polycarbonates obtained using bis(4-hydroxyphenyl)alkane compounds, such as bisphenol A, as major starting compounds, and further include copolycarbonates obtained by the combined use of two or more aromatic dihydroxy compounds and branched polycarbonates obtained using a small proportion of a trihydric phenol compound. The aromatic polycarbonate resin to be blended may also be a mixture of two or more aromatic polycarbonates.

The poly(phenylene sulfide) (PPS) resin to be blended with the hydroxy-substituted poly(phenylene ether) resin may be a crystalline resin containing a repeating unit of formula (IX):

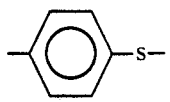

(IX)

as the major structural unit.

In the present invention, the PPS resin may be poly(-phenylene sulfide) consisting of the above-described repeating unit or may be a copolymer comprising a major proportion, preferably 80 mol % or more, more preferably 90 mol % or more, of the above-described repeating unit and a small residual proportion, preferably 20 mol % or less, of other repeating unit(s) such as the following:

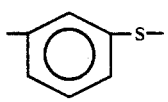

(X)

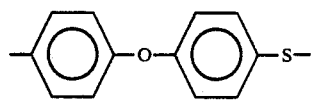

(XI)

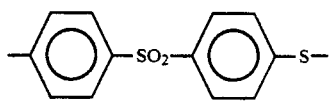

(XII)

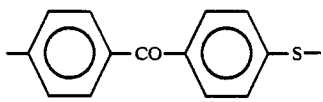

(XIII)

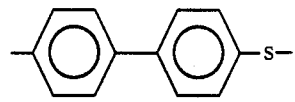

(XIV)

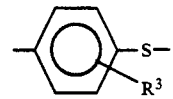

(XV)

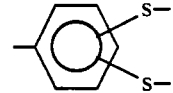

(XVI)

where $R^3$ is an alkyl group having 1 to 8 carbon atoms, phenyl group, or an alkoxyl group.

It is preferable that the PPS to be blended have a substantially linear structure, to obtain optimum properties in articles formed from the resin composition. However, a polymerization-crosslinked PPS obtained using, during polymerization, an effective amount of a crosslinking agent, such as a trihalobenzene, or a heat-crosslinked PPS obtained by crosslinking a PPS under suitable conditions, such as heat-treating in the presence of oxygen, may also be used so long as the properties of formed articles do not substantially deteriorate.

The PPS may have a melt viscosity as measured at 300° C. of from 100 to 100,000 poises, preferably from 500 to 50,000 poises. If the melt viscosity of the PPS is below 100 poises, shaping the composition is difficult due to high flowability. If the melt viscosity exceeds 100,000 poises, shaping of the composition is likewise difficult due to flowability which is too low.

The PPS to be blended may be produced by any method as long as the production method used will not defeat the objects of the present invention. However, preferred PPS's, which satisfy the above requirements, may be produced according to a process such as that disclosed in JP-B-45-3368 for producing a relatively low molecular weight polymer, a process such as that disclosed in JP-B-52-12240 for producing a linear, relatively high molecular weight polymer, a process comprising heating a low molecular weight polymer in the presence of oxygen to produce a crosslinked polymer, or modifications of these processes. (The term "JP-B" as used herein means an "examined Japanese patent publication".)

In the thermoplastic resin composition of the present invention, the hydroxy-substituted poly(phenylene ether) resin, component (B), having an alcoholic hydroxyl group in a side chain, may be present in an amount of from 10 to 90% by weight. If the content of component (B) is below 10% by weight, the articles formed from the resin composition have insufficient high-temperature rigidity. If the content of Component (B) exceeds 90% by weight, the composition has poorer formability and solvent resistance than unmodified poly(2,6-dimethylphenylene ether).

The hydroxy-substituted poly(phenylene ether) resin of the present invention may also be used as a compatibilizer for resin compositions comprising from 10 to 70% by weight of a thermoplastic resin such as those described above and from 90 to 30% by weight of poly(2,6-dimethylphenylene ether). In this case, the hydroxy-substituted poly(phenylene ether) may be incorporated in an amount of from 1 to 10 parts by weight per 100 parts by weight of the sum of the two resins, preferably from 2 to 8 parts by weight, more preferably from 3 to 6 parts by weight.

Additional Components

The thermoplastic resin composition of the present invention may contain components other than components (A) and (B) described above. For example, the resin composition may contain unmodified poly(2,6-dimethylphenylene ether) in such a manner that not larger than 80% by weight of an amount of component (A) is replaced with it. The resin composition may further contain from 0.05 to 3 parts by weight of an antioxidant, weatherability improver, nucleating agent, colorant, or dispersant, from 0.5 to 20 parts by weight of a plasticizer or flowability improver, or from 1 to 50 parts by weight of a flame retardant, per 100 parts by weight of the sum of the resin components.

It is also possible to incorporate into the composition from 5 to 50 parts by weight of an organic or inorganic filler such as glass fiber, mica, talc, wallastonite, potassium titanate, calcium carbonate, or silica per 100 parts by weight of the sum of the resin components. A dispersant for colorants may be incorporated at a level of from 0.5 to 5 parts by weight per 100 parts by weight of the sum of the resin components. Further, an impact strength modifier may be incorporated in an amount of from 5 to 30 parts by weight per 100 parts by weight of the sum of the resin components. Examples of the impact strength modifier include styrene-butadiene copolymer rubbers, hydrogenated styrene-butadiene copolymer rubbers, ethylene-propylene copolymer rubbers, ethylene-propylene-diene copolymer rubbers, modified rubbers obtained by modifying the above-mentioned rubbers with an α,β-unsaturated carboxylic anhydride, unsaturated glycidyl ester, or unsaturated glycidyl ether, copolymers of an unsaturated epoxy compound and ethylene, and copolymers of an unsaturated epoxy compound, ethylene, and an ethylenically unsaturated compound. These additive ingredients may be incorporated alone or in combinations of two or more.

Preparation Method and Shaping Method for the Composition

The thermoplastic resin composition of the present invention may be obtained through melt kneading, which may be conducted by a conventional kneading method used for thermoplastic resins. For example, the resinous components, which may be powdery or granular, can be uniformly mixed together with, any desired additive ingredients by a mixing means, such as a Henschel mixer, ribbon blender, or V-shaped blender and then kneaded with a kneading means, such as a single-screw or multi-screw extruder, roller mill, or Banbury mixer.

Shaping methods for the thus-produced thermoplastic resin composition of the present invention are not particularly limited, and conventional thermoplastic resin molding or forming techniques, such as injection molding, blow molding, extrusion molding, sheet forming, thermoforming, laminating, or press molding may be used.

Having generally described this invention, a further understanding can be obtained by reference to certain specific examples which are provided herein for purposes of illustration only and are not intended to be limiting unless otherwise specified.

In the following Synthesis Example, Examples, and Comparative Examples, all parts and percents are by weight unless otherwise indicated. The alcoholic hydroxyl group content in a resin means the amount (mol %) of alcoholic hydroxyl group based on the amount of phenylene ring contained in the polymer backbone. This value was calculated from the integrated strength of a signal attributable to hydroxyl-bonded methylene which appears at around 3.6 ppm in a $^1$H-NMR chart for the resin. Further, the values of number-average molecular weight (referred to as "Mn") and weight-average molecular weight (referred to as "Mw") are values measured by gel permeation chromatography and calculated based on polystyrene as standard.

It is noted that the hydroxy-substituted poly(phenylene ether)s obtained in Examples 1 to 5 are random copolymers consisting of x structural units shown by formula (XVII) given below and y structural units shown by formula (XVIII) given below, while the hydroxy-substituted poly(phenylene ether) obtained in Example 6 is a homopolymer consisting of the structural unit of formula (XVII).

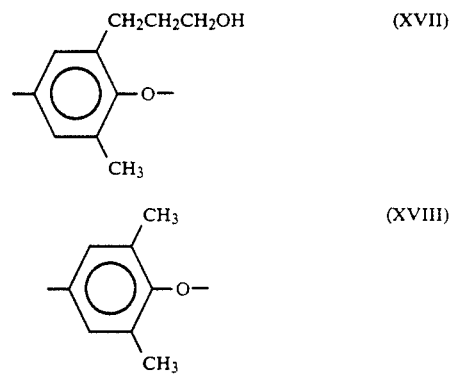

SYNTHESIS EXAMPLE

Synthesis of 2-(3-hydroxypropyl)-6-methylphenol

In 391 parts of pyridine was dissolved 49.1 parts of 2-allyl-6-methylphenol in a nitrogen gas atmosphere. At room temperature, 47.3 parts of trimethylchlorosilane was added dropwise to the above solution and the resulting mixture was allowed to react for 1 hour. Thereafter, the reaction mixture was washed with pure water to remove a pyridine hydrochloric acid salt and the trimethylchlorosilane remaining unreacted, and then extracted with diethyl ether. From the extract, 2-allyl-6-methylphenoxytrimethylsilane (having a boiling point of 101° C. at 7 mmHg) was obtained by vacuum distillation.

In dry tetrahydrofuran (abbreviated as THF) was dissolved 42.7 parts of the above-obtained 2-allyl-6-methylphenoxytrimethylsilane in a nitrogen atmosphere. Thereto was added dropwise at 5° C. 86.2 parts of a 1 mol/l THF solution of a borane, and this mixture was allowed to react at 20° C. for 1 hour. To the resulting reaction mixture was added 15 parts of pure water, followed by 45 parts of 10% aqueous sodium hydroxide solution. Subsequently, 40 parts of 30% hydrogen per-oxide was added dropwise to the reaction mixture at 40° C. and reaction was further conducted at 50° C. for 1 hour. Through extraction with diethyl ether, the desired compound, 2-(3 hydroxypropyl)-6-methylphenol, was obtained from the reaction mixture.

EXAMPLE 1

In a mixture of 2,890 parts of xylene and 766 parts of methanol were dissolved 136 parts of the phenol-substituted compound, 2-(3-hydroxypropyl)-6-methylphenol, obtained in Synthesis Example, 886 parts of 2,6-dimethylphenol, and 20 parts of sodium hydroxide. To this solution were then added 40 parts of diethanolamine, 12.6 parts of dibutylamine, and 0.96 part of manganese chloride tetrahydrate dissolved in 316 parts of methanol, in this order. Polymerization reaction was then conducted in two stages. In the former stage, the reaction was performed at 40° C. while oxygen gas was introduced at a rate of 0.8 l/min, until a precipitate began to separate out.

In the latter stage, the reaction was conducted at 30° C. while oxygen gas and nitrogen gas were introduced at rates of 0.8 l/min and 8 l/min, respectively, until the polymer precipitation ended. The polymer was then washed with methanol acidified with hydrochloric acid to deactivate the catalyst, thereby to obtain a desired hydroxy-substituted poly(phenylene ether) resin (OH-PPE-1).

Figure 2:
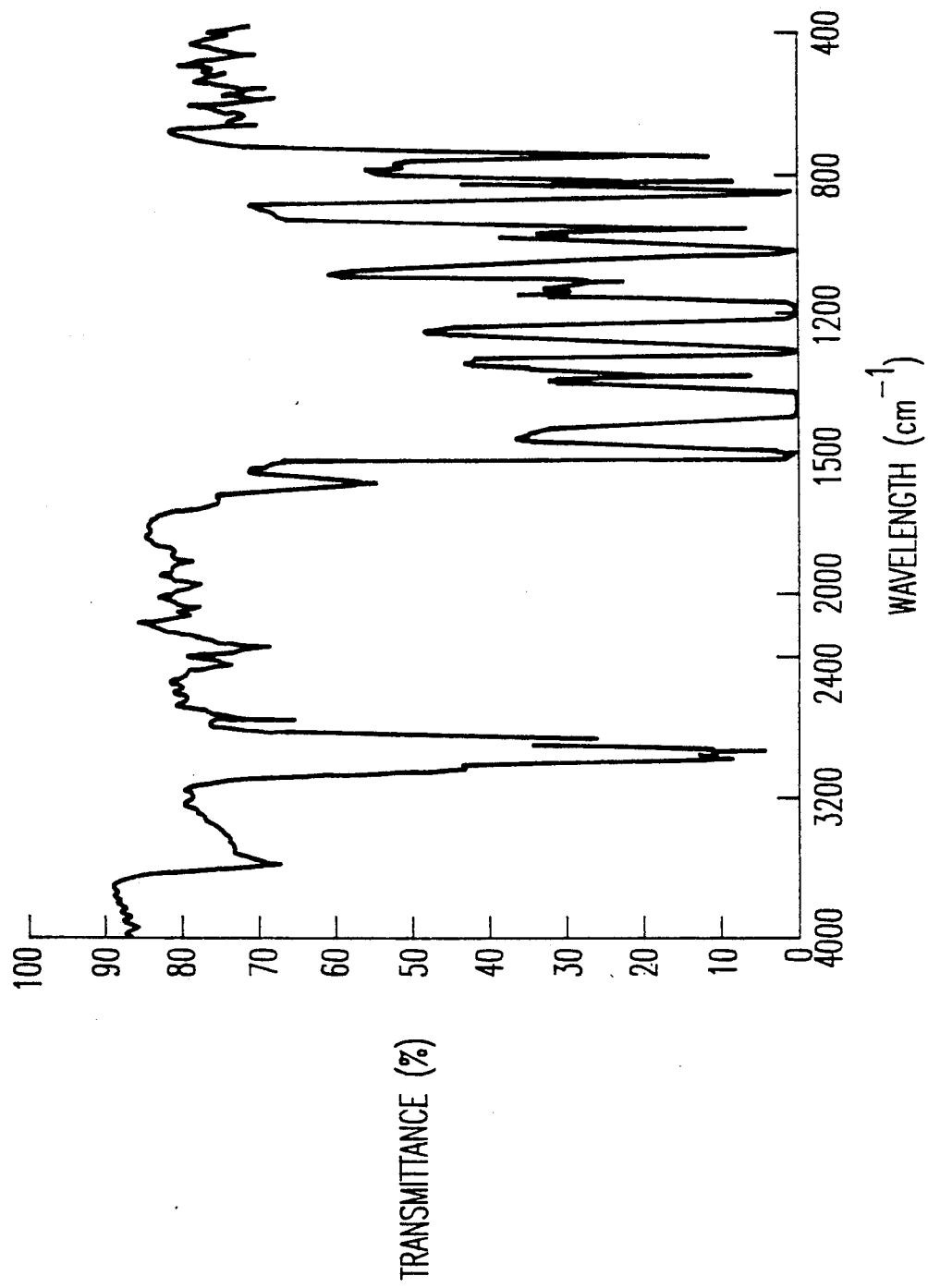
FIG. 2 is an IR chart for the novel hydroxy-substituted poly(phenylene ether) obtained in Example 1.

An IR chart and $^1$H-NMR chart for the thus-obtained resin are shown in FIGS. 1 and 2, respectively.

| Yield: | 94% |
| --- | --- |
| Hydroxyl group content (100x/(x + y)): | 7.2 mol % |
| Conversion of the alcoholic hydroxyl group-containing monomer: | 72% |
| Mn: | 26,470 |
| Mw: | 79,900 |

EXAMPLE 2

The same procedures as in Example 1 were conducted except that the amounts of the substituted phenol compound, 2-(3-hydroxypropyl)-6-methylphenol, obtained in Synthesis Example and 2,6-dimethylphenol were changed to 60 parts and 935 parts, respectively. Thus, a hydroxy-substituted poly(phenylene ether) resin (OH-PPE-2) was obtained.

| Yield: | 91% |
| --- | --- |
| Hydroxyl group content (100x/(x + y)): | 2.3 mol % |
| Conversion of the alcoholic hydroxyl group-containing monomer: | 51% |
| Mn: | 20,710 |
| Mw: | 52,730 |

EXAMPLE 3

The same procedures as in Example 1 were conducted except that the amounts of sodium hydroxide, diethanolamine, and manganese chloride tetrahydrate were changed to 9.1 parts, 20.5 parts, and 0.48 part, respectively. Thus, a hydroxy-substituted poly(phenylene ether) resin (OH-PPE-3) was obtained.

| Yield: | 95% |
| --- | --- |
| Hydroxyl group content (100x/(x + y)): | 7.6 mol % |
| Conversion of the alcoholic | 76% |
| hydroxyl group-containing monomer: | |
| Mn: | 9,890 |
| Mw: | 22,310 |

EXAMPLE 4

The same procedures as in Example 3 were conducted except that the amounts of the substituted phenol compound obtained in Synthesis Example and 2,6-dimethylphenol were changed to 68 parts and 952 parts, respectively. Thus, a hydroxy-substituted poly(phenylene ether) resin (OH-PPE-4) was obtained.

| Yield: | 95% |
| --- | --- |
| Hydroxyl group content (100x/(x + y)): | 3.6 mol % |
| Conversion of the alcoholic hydroxyl group-containing monomer: | 72% |
| Mn: | 14,040 |
| Mw: | 36,600 |

EXAMPLE 5

The same procedures as in Example 3 were conducted except that the amounts of the substituted phenol compound obtained in Synthesis Example and 2,6-dimethylphenol were changed to 27 parts and 964 parts, respectively. Thus, a hydroxy-substituted poly(phenylene ether) resin (OH-PPE-5) was obtained.

| Yield: | 94% |
| --- | --- |
| Hydroxyl group content (100x/(x + y)): | 1.6 mol % |
| Conversion of the alcoholic hydroxyl group-containing monomer: | 79% |
| Mn: | 18,950 |
| Mw: | 45,480 |

EXAMPLE 6

In 48 parts of pyridine and 140 parts of methanol was dissolved 0.57 part of copper(I) chloride. This solution was stirred at room temperature for 10 minutes in an oxygen atmosphere. Thereto was then added a solution prepared by dissolving 28 parts of the substituted phenol compound obtained in Synthesis Example in 200 parts of methanol. The resulting mixture was allowed to react at 25° C. for 18 hours while oxygen was introduced at a rate of 100 ml/min. After the reaction, a polymer formed was precipitated from pure water and then washed with dilute hydrochloric acid to remove the catalyst. Thus, a desired hydroxy-substituted poly(phenylene ether) resin (OH-PPE-6) was obtained.

Figure 3:
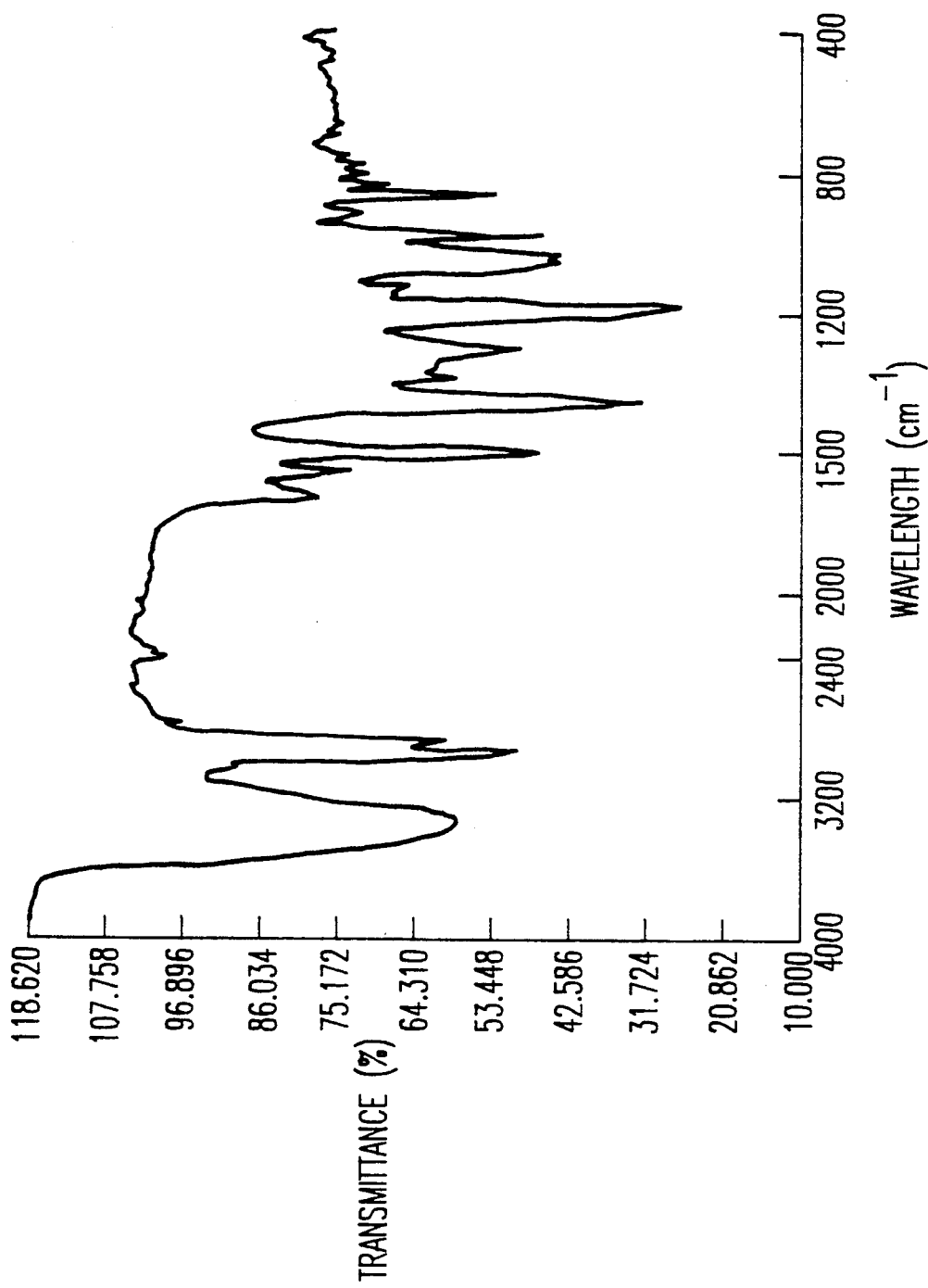
FIG. 3 is an IR chart for the novel hydroxy-substituted poly(phenylene ether) obtained in Example 6.

An infrared absorption spectrum for the thus-obtained resin is shown in FIG. 3.

| Yield: | 88% |
| --- | --- |
| Hydroxyl group content (100x/x + y)): | 100 mol % |
| Mn: | 6,700 |
| Mw: | 16,800 |

EXAMPLE 7

In 2,890 parts of xylene and 766 parts of methanol were dissolved 27 parts of 2-(3-hydroxypropyl)-6-methylphenol, 980 parts of 2,6-dimethylphenol, and 9.1 parts of sodium hydroxide.

To the solution were then added 20.5 parts of diethanolamine, 12.6 parts of dibutylamine, and 0.48 part of manganese chloride tetrahydrate dissolved in 316 parts of methanol, in this order.

Polymerization reaction was then conducted in two stages. In the former stage, the reaction was performed at 40° C. while oxygen gas was introduced at a rate of 0.8 l/min, until a precipitate began to separate out. In the latter stage, the reaction was conducted at 30° C. while oxygen gas and nitrogen gas were introduced at rates of 0.8 l/min and 8 l/min, respectively, until the polymer precipitation ended.

The polymer was then washed with methanol acidified with hydrochloric acid to deactivate the catalyst, thereby to obtain a desired hydroxy-substituted poly(phenylene ether) resin (OH-PPE-7).

| | |
|---|---|
| Yield: | 93% |
| Hydroxyl group content (100x/(x + y)): | 1.3 mol % |
| Conversion of the alcoholic hydroxyl group-containing monomer: | 66% |
| Mn: | 10,950 |
| Mw: | 21,200 |

EXAMPLE 8

The same procedures as in Example 7 were conducted except that the amount of 2-(3-hydroxypropyl)-6-methylphenol was changed to 82 parts and that 940 parts of 2,6-dimethylphenol was used. Thus, a hydroxy-substituted poly(phenylene ether) resin (OH-PPE-8) was obtained.

| | |
|---|---|
| Yield: | 90% |
| Hydroxyl group content (100x/(x + y)): | 4.0 mol % |
| Conversion of the alcoholic hydroxyl group-containing monomer: | 66% |
| Mn: | 6,800 |
| Mw: | 13,400 |

EXAMPLE 9

The same procedures as in Example 1 were conducted except that in place of 2-(3-hydroxypropyl)-6-methylphenol, use was made of 74 parts of an alcoholic hydroxyl group-containing phenol compound mixture consisting of 53% of 2-(4-hydroxybutyl)-6-methylphenol, 23% of 2-(3-hydroxy-2-methylpropyl)-6-methylphenol, and 24% of 2-(1-ethyl-2-hydroxyethyl)-6-methylphenol, and that the amount of 2,6-dimethylphenol was changed to 950 parts. Thus, a hydroxy-substituted poly(phenylene ether) resin (OH-PPE-9) was obtained.

| | |
|---|---|
| Yield: | 94% |
| Hydroxyl group content (100x/(x + y)): | 4.1 mol % |
| Conversion of the alcoholic hydroxyl group-containing monomers: | 82% |
| Mn: | 18,400 |
| Mw: | 41,000 |

EXAMPLE 10

The same procedures as in Example 3 were conducted except that 114 parts of 2-(2,3-dihydroxypropyl)-6-methylphenol was used in place of 2-(3-hydroxypropyl)-6-methylphenol and that the amounts of 2,6-dimethylphenol and sodium hydroxide were changed to 926 parts and 15.4 parts, respectively. Thus, a hydroxy-substituted poly(phenylene ether) resin (OH-PPE-10) was obtained.

| | |
|---|---|
| Yield: | 89% |
| Hydroxyl group content (100x/(x + y)): | 6.9 mol % |
| Conversion of the alcoholic hydroxyl group-containing monomer: | 45% |
| Mn: | 5,600 |
| Mw: | 15,200 |

EXAMPLE 11

In 2,890 parts of xylene and 766 parts of methanol were dissolved 98 parts of 2-(3-hydroxypropyl)methylphenol, 942 parts of 2,6-dimethylphenol, and 9.1 parts of sodium hydroxide.

To the solution were then added 20.5 parts of diethanolamine, 12.6 parts of dibutylamine, and 0.48 part of manganese chloride tetrahydrate dissolved in 316 parts of methanol, in this order.

Polymerization reaction was then conducted in two stages. In the former stage, the reaction was performed at 40° C. while oxygen gas was introduced at a rate of 0.8 l/min, until a precipitate began to separate out. In the latter stage, the reaction was conducted at 30° C. while oxygen gas and nitrogen gas were introduced at rates of 0.8 l/min and 8 l/min, respectively, until the polymer precipitation ended.

The polymer was then washed with methanol acidified with hydrochloric acid to deactivate the catalyst, thereby to obtain a desired hydroxy-substituted poly(phenylene ether) resin (OH-PPE-11).

| | |
|---|---|
| Yield: | 94% |
| Hydroxyl group content (100x/(x + y)): | 5.4 mol % |
| Conversion of the alcoholic hydroxyl group-containing monomer: | 76% |
| Mn: | 13,900 |
| Mw: | 34,880 |

EXAMPLE 12

The same procedures as in Example 11 were conducted except that the amount of 2-(3-hydroxypropyl)-6-methylphenol was changed to 80 parts. Thus, a hydroxy-substituted poly(phenylene ether) resin (OH-PPE-12) was obtained.

| | |
|---|---|
| Yield: | 94% |
| Hydroxyl group content (100x/(x + y)): | 4.4 mol % |
| Conversion of the alcoholic hydroxyl group-containing monomer: | 75% |
| Mn: | 10,200 |
| Mw: | 18,380 |

COMPARATIVE EXAMPLE 1

Into a 10-liter autoclave made of stainless steel were introduced 4,300 parts of xylene and 500 parts of poly(2,6-dimethylphenylene ether) (PPE) [intrinsic viscosity 0.3 dl/g; manufactured by Nippon Polyether Co., Ltd., Japan; Grade H-30]. The contents were stirred to dissolved the PPE. Subsequently, 20 parts of ethylene oxide was forced into the autoclave and reaction was conducted at 150° C. for 5 hours. After cooling, the resulting reaction mixture was poured into 15,600 parts of methanol, upon which a polymer precipitated. This polymer was filtered off and washed with methanol, thereby obtaining an alcoholic hydroxyl group-modified PPE in which the terminal hydroxyl groups of the PPE had been substituted with an aliphatic group containing an alcoholic hydroxyl group.

Yield: 99%
Hydroxyl group content: 1.2 mol %

EXAMPLE 13

40 Parts of the hydroxy-substituted poly(phenylene ether) obtained in Example 3 was dry-blended with 60 parts of poly(butylene terephthalate) [trade name, Novador 5010; manufactured by Mitsubishi Chemical Industries Ltd., Japan] in such quantities that the two polymers amounted about 50 g. This blend was kneaded at 250° C. for 10 minutes using a Labo Plastomill kneader manufactured by Toyo Seiki Seisakusho K.K., Japan, and then formed into a 2 mm-thick sheet by press molding.

The thus-obtained resin composition was evaluated for dispersed-phase particle diameter and Izod impact strength according to the following methods. The results obtained are shown in Table 1. Izod Impact Strength:

In accordance with JIS K-7110, unnotched Izod impact strength measurement was made at 23° C. with an Izod impact tester manufactured by Toyo Seiki Seisakusho K.K., using a sample prepared by superposing three 2 mm-thick test pieces and tying them together by means of pressure-sensitive tape "Cello Tape" (trade name) manufactured by Nichiban Co., Ltd., Japan. Dispersed-Phase Particle Diameter:

The composition sheet was partly cut and the cut piece was immersed in toluene for 5 seconds at room temperature thereby to allow the sheet to selectively dissolve PPE particles therefrom into the toluene. The resulting cut piece was examined for dispersed-phase PPE particle diameter with scanning electron microscope S-2400 manufactured by Hitachi Ltd., Japan.

COMPARATIVE EXAMPLE 2

A composition sheet was obtained in the same manner as in Example 13 except that the alcoholic hydroxyl group-modified PPE obtained in Comparative Example 1 was used in place of the hydroxy-substituted poly(phenylene ether) obtained in Example 3.

The composition sheet obtained was evaluated for dispersed-phase particle diameter and Izod impact strength in the same manner as in Example 13. The results obtained are shown in Table 1.

TABLE 1

|  | Izod impact strength (unnotched) (kg · cm/cm$^2$) | Dispersed-phase particle diameter ($\mu$m) |
|---|---|---|
| Example 13 | 29.2 | 1–2 |
| Comparative Example 2 | 14.5 | 2–8 |

EXAMPLES 14 TO 20 AND COMPARATIVE EXAMPLES 3 TO 7

Using the hydroxy-substituted poly(phenylene ether)s obtained in Examples 7 to 10, nylon-6 [trade name, Ultramide KR4411; manufactured by BASF A.G.; in Table 2, referred to as "PA KR4411"], poly(2,6-dimethyl-1,4-phenylene ether) [trade name, PPE H-30; manufactured by Nippon Polyether Co., Ltd. and having an intrinsic viscosity as measured at 30° C. in chloroform of 0.31 dl/g; in Table 2, referred to as "PPE H-30"], and maleic anhydride as a compatibilizer, granular resin compositions were prepared according to the formulations shown in Table 2, by kneading the ingredients at 280° C. and 60 r.p.m. for 5 minutes with a Labo Plastomill kneader manufactured by Toyo Seiki Seisakusho K.K., followed by grinding.

Each of the thus-obtained resin compositions was formed at 280° C. into a sheet having a length of 180 mm, width of 180 mm, and thickness of 2 mm, using a compression molding machine manufactured by Toyo Seiki Seisakusho K.K., and then cut into test pieces for property evaluations.

In preparing the compositions, the polyamide was used after being dried in a vacuum at 80° C. for 15 hours. The test pieces prepared above were allowed to stand in a desiccator for 2 to 6 days, before being subjected to property evaluations, which were conducted by the following methods. The results obtained are summarized in Table 2.

(1) Flexural Modulus

In accordance with JIS K-7203, a test piece having a width of 25 mm, length of 80 mm, and thickness of 2 mm was tested for flexural modulus using an Instron tester. In determining the flexural modulus at 80° C., a thermostatic chamber of the circulating-air type was installed so that the test piece and the supporting base and loading nose of the Instron tester were located inside the chamber, and 80° C.-measurement was made after the sample had been conditioned in an atmosphere of 80°±1° C. for 20 minutes or more.

(2) Izod Impact Strength

In accordance with JIS K-7110, unnotched Izod impact strength measurement was made at 23° C. with an Izod impact tester manufactured by Toyo Seiki Seisakusho K.K., using a sample prepared by superposing three 2 mm-thick test pieces and tying them together by means of pressure-sensitive tape "Cello Tape" (trade name) manufactured by Nichiban Co., Ltd.

(3) Hue

In accordance with JIS Z-8729, the hue of a sample was determined by measuring the L value of the sample with a Color and Color-Difference Meter manufactured by Minolta Co., Ltd., Japan.

(4) Dispersed-Phase Particle Diameter

A sample sheet was partly cut and the cut piece was immersed in toluene for 5 seconds at room temperature thereby to allow the sheet to selectively dissolve PPE particles therefrom into the toluene. The resulting cut piece was examined for dispersed-phase PPE particle diameter with scanning electron microscope S-2400 manufactured by Hitachi Ltd.

TABLE 2

|  | Example | | | | | | | Comparative Example | | | | |
|---|---|---|---|---|---|---|---|---|---|---|---|---|
|  | 14 | 15 | 16 | 17 | 18 | 19 | 20 | 3 | 4 | 5 | 6 | 7 |
| Formulation (wt %) | | | | | | | | | | | | |

TABLE 2-continued

|  | Example | | | | | | | Comparative Example | | | | |
| --- | --- | --- | --- | --- | --- | --- | --- | --- | --- | --- | --- | --- |
|  | 14 | 15 | 16 | 17 | 18 | 19 | 20 | 3 | 4 | 5 | 6 | 7 |
| PA KR4411 | 50 | 50 | 50 | 30 | 70 | 50 | 50 | 50 | 49 | 100 | — | 29 |
| OH-PPE-7 | 50 | — | — | 70 | 30 | — | — | — | — | — | — | — |
| OH-PPE-8 | — | 50 | 25 | — | — | — | — | — | — | — | — | — |
| OH-PPE-9 | — | — | — | — | — | 50 | — | — | — | — | — | — |
| OH-PPE-10 | — | — | — | — | — | — | 10 | — | — | — | — | — |
| PPE H-30 | — | — | 25 | — | — | — | 40 | 50 | 49 | — | 100 | 69 |
| Maleic anhydride | — | — | — | — | — | — | — | — | 2 | — | — | 2 |
| Property | | | | | | | | | | | | |
| Flexural modulus (kg/cm$^2$) | | | | | | | | | | | | |
| 23° C. | 22,100 | 22,400 | 21,800 | 24,000 | 22,800 | 23,400 | 21,500 | 20,900 | 21,400 | 23,000 | 21,000 | 23,200 |
| 80° C. | 8,700 | 8,900 | 8,600 | 13,000 | 5,600 | 9,300 | 8,600 | 8,900 | 8,700 | 3,800 | 20,200 | 12,800 |
| Izod impact strength (kgf · cm/cm$^2$) | 38.5 | 36.2 | 40.8 | 13.3 | 48.8 | 33.4 | 37.6 | 12.4 | 29.0 | 54.0 | 4.0 | 10.5 |
| Hue (L value) | 36 | 35 | 41 | 38 | 48 | 34 | 35 | 44 | 19 | 80 | 68 | 11 |
| Dispersed-phase particle diameter (μm) | 1–3 | 1–3 | 1–5 | 1–2 | 0.5–1 | 1–3 | 2–5 | 2–10 | 1–4 | — | — | 1–2 |

EXAMPLES 21 TO 24 AND COMPARATIVE EXAMPLES 8 TO 12

Using the hydroxy-substituted poly(phenylene ether)s obtained in Examples 7 and 8, poly(2,6-dimethylphenylene ether), and a polycarbonate [trade name, Iupilon S2000; manufactured by Mitsubishi Gas Chemical Company, Inc., Japan and having a viscosity-average molecular weight of 25,000; in Table 3, referred to as PC S2000], granular resin compositions were prepared according to the formulations shown in Table 3, by kneading the ingredients at 260° C. and 180 r.p.m. for 5 minutes with a Labo Plastomill kneader manufactured by Toyo Seiki Seisakusho K.K., followed by grinding.

Each of the thus-obtained resin compositions was injection-molded at 280° C. into test pieces using a CS 183MMX Minimax injection molding machine manufactured by Custom Scientific Co.

In preparing the compositions, the polycarbonate was used after being dried in a vacuum at 100° C. for 10 to 15 hours. The test pieces prepared above were allowed to stand in a desiccator for 2 to 6 days, before being subjected to property evaluations, which were conducted by the following methods. The results obtained are summarized in Table 3.

(1) Melt Flow Rate

Melt flow rate (MFR) was measured in accordance with JI K-7210 under conditions of 280° C. and 10-kg load.

(2) Impact Strength

Test pieces having a length of 31.5 mm, width of 6.2 mm, and thickness of 3.2 mm were formed by injection molding, and the unnotched and notched Izod impact strengths were measured at 23° C. using Minimax Izod impact tester Model CS-138TI manufactured by Custom Scientific Co., according to JIS K-7110. For the notched impact strength measurement, a notch having a notch bottom radius of 0.25 mm and notch depth of 1.2 mm was formed.

(3) Dispersed Phase Evaluation

Each molded sample was partly cut and the cut piece was melted on a slide glass to form a film of the composition. This film was examined with a phase contrast microscope manufactured by Olympus Optical Co., Ltd., Japan at a magnification of 250 to 500 diameters. Because the dispersed-phase particles in the samples of the Examples were very fine, these samples were further analyzed by a method in which part of each sample was dyed with osmium tetraoxide and then sliced with an ultramicrotome to prepare an ultra-thin section, which was examined with a transmission electron microscope, JEM-100SX, manufactured by JEOL Ltd., Japan at a magnification of 2,000 to 10,000 diameters.

With respect to the sample of Comparative Example 11, test pieces could not be prepared by injection molding due to the poor flowability of the poly(phenylene ether) (PPE H30). Because of this, a 2 mm-thick sheet was prepared by press molding at 280° C., and test pieces for evaluation were cut out of the sheet. The impact strength measurement for this sample was made as follows. Impact Strength:

Three 2 mm-thick test pieces were superposed, tied together by means of pressure-sensitive tape "Cellophane Tape" (trade name) manufactured by Nitto Electric Industrial Co., Ltd., Japan, and then subjected to an impact strength test measured in accordance with JIS K-7110.

TABLE 3

|  | Ex. 21 | Ex. 22 | Comp. Ex. 8 | Comp. Ex. 9 | Ex. 23 | Comp. Ex. 10 | Ex. 24 | Comp. Ex. 11 | Comp. Ex. 12 |
| --- | --- | --- | --- | --- | --- | --- | --- | --- | --- |
| Formulation (wt %) | | | | | | | | | |
| OH-PPE-7 | 50 | — | — | — | 30 | — | 90 | — | — |
| OH-PPE-8 | — | 25 | — | — | — | — | — | — | — |
| PPE H30 | — | 25 | 50 | 70 | — | 30 | — | 100 | — |
| PC S2000 | 50 | 50 | 50 | 30 | 70 | 70 | 10 | — | 100 |
| Property | | | | | | | | | |
| MFR (g/10 min) | 72 | 102 | 56 | 29 | 48 | 35 | 36 | 16 | 26 |
| Izod impact strength (kg-cm/cm$^2$) | | | | | | | | | |
| Unnotched | 18.4 | 13.2 | 10.6 | 10.5 | 38.0 | 22.0 | 5.0 | 3.6 | 65.0 |
| Notched | 1.8 | 2.1 | 1.0 | 1.0 | 4.1 | 3.4 | 1.9 | 1.3 | 60.4 |
| Dispersed phase | 2–10 | 2–5 | 50 | 10–30 | 1–5 | 10–30 | 1–2 | — | — |

TABLE 3-continued

|  | Ex. 21 | Ex. 22 | Comp. Ex. 8 | Comp. Ex. 9 | Ex. 23 | Comp. Ex. 10 | Ex. 24 | Comp. Ex. 11 | Comp. Ex. 12 |
| --- | --- | --- | --- | --- | --- | --- | --- | --- | --- |
| Particle diameter (μm) Constituent | poly-carbonate | poly-carbonate | (continuous) | poly-carbonate | poly-(phenylene ether) | poly-(phenylene ether) | poly-carbonate | — | — |

COMPARATIVE EXAMPLE 13

The inside of a 2-liter autoclave equipped with a mechanical stirrer was replaced with nitrogen. Into the autoclave were then introduced 50 parts of poly(2,6-dimethylphenylene ether) having a number-average molecular weight of 15,000 and 1,000 parts of tetrahydrofuran. The contents were heated at 50° C. to dissolve the polymer.

After the temperature in the autoclave was lowered to 25° C., n-butyllithium (as 1.6 mol/l hexane solution) was added to the solution in an amount of 14 parts [the n-butyllithium amount being 7.8 mol % based on the amount of the repeating unit in the poly(phenylene ether)] and reaction was conducted at that temperature for 30 minutes. Subsequently, 4 parts of ethylene oxide was pressed into the autoclave and reaction was performed for 1 hour.

After the reaction, the resulting polymer was precipitated from a large amount of methanol and then washed with methanol and water, thereby obtaining a modified poly(phenylene ether) resin (OH-PPE-13).

Polymer recovery: 78%
Hydroxyl group content: 3.2 mol %
Selectivity of butyllithium: 41%
Mn: 11,000

EXAMPLES 25 TO 30 AND COMPARATIVE EXAMPLE 14

Using the hydroxy-substituted poly(phenylene ether)s obtained in Examples 4, 11 and 12, and Comparative Example 13 and poly(butylene terephthalate) [trade name, Novador 5010; manufactured by Mitsubishi Chemical Industries Ltd.; hereinafter abbreviated as "PBT"] which had been dried beforehand in a vacuum at 100° C. for 24 hours, granular resin compositions were prepared according to the formulations shown in Table 4, by kneading the ingredients at 250° C. and 180 r.p.m. for 10 minutes with a Labo Plastomill kneader manufactured by Toyo Seiki Seisakusho K.K., followed by grinding.

The thus-obtained resin compositions were evaluated for Izod impact strength (unnotched) and dispersed-phase particle diameter by the same methods as in Examples 21 to 24 given above. The compositions were further evaluated for flexural modulus according to the following method. The results obtained are summarized in Table 4. Flexural Modulus:

A 2 mm-thick sheet was formed from each resin composition by press molding at 280° C. using a hydraulic press molding machine manufactured by Toyo Seiki Seisakusho K.K. Test pieces having a width of 15 mm and length of 80 mm were cut out of the sheet and their cantilever flexural strength was measured in accordance with JIS K-7106 under conditions of 23° C. and a bend angle of 10°.

TABLE 4

|  | Example | | | | | Comp. Ex. | Ex. |
| --- | --- | --- | --- | --- | --- | --- | --- |
|  | 25 | 26 | 27 | 28 | 29 | 14 | 30 |
| Formulation (wt %) | | | | | | | |
| OH-PPE-11 | 40 | — | — | — | 20 | — | — |
| OH-PPE-4 | — | 40 | — | — | — | — | — |
| OH-PPE-12 | — | — | 40 | 20 | — | — | — |
| OH-PPE-13 | — | — | — | — | — | — | 40 |
| PPE | — | — | — | 20 | 20 | 40 | — |
| PBT | 60 | 60 | 60 | 60 | 60 | 60 | 60 |
| Property | | | | | | | |
| Flexural modulus (kg/cm$^2$) | 19,800 | 20,200 | 19,800 | 19,100 | 20,200 | 21,100 | 21,000 |
| Izod impact strength, unnotched (kg · cm/cm$^2$) | 40.5 | 30.2 | 28.0 | 22.3 | 16.0 | 13.5 | 25.4 |
| Dispersed-phase particle diameter (μm) | 0.5-1 | 1-2 | 0.5-1 | 1-2 | 1-3 | 5-10 | 2-5 |

EXAMPLES 31 TO 33 AND COMPARATIVE EXAMPLES 15 TO 19

Using the hydroxy-substituted poly(phenylene ether)s obtained in Examples 7 and 8, poly(phenylene sulfide) [trade name, Torprene T-4P; manufactured by Torprene Co.; hereinafter abbreviated as "PPS"], and poly(2,6-dimethyl-1,4-phenylene ether) (PPE H30), granular resin compositions were prepared according to the formulations shown in Table 5, by kneading the ingredients at 310° C. and 180 r.p.m. for 5 minutes using a Labo Plastomill kneader manufactured by Toyo Seiki Seisakusho K.K., followed by grinding.

Each of the thus-obtained resin compositions was injection-molded at 310° C. into test pieces using a CS 183MMX Minimax injection molding machine manufactured by Custom Scientific Co., and the test pieces were then heat-treated at 120° C. for 4 hours in a hot-air oven to thereby allow the PPS to crystallize sufficiently.

In preparing the compositions, the PPS was used after being dried in a vacuum at 120° C. for 10 to 15 hours. The test pieces prepared above were allowed to stand in a desiccator for 2 to 6 days, before being subjected to property evaluations, which were conducted by the following methods. The results obtained are summarized in Table 5.

(1) High-Temperature Modulus in Torsion

A test piece having a length of 47 mm, width of 5 mm, and thickness of 2 mm was prepared by injection molding, and the temperature dependence of the storage modulus in torsion (E') of the sample was measured at a frequency of 1 Hz using a solid viscoelasticity-measuring apparatus RSA II manufactured by Rheometrics Far East K.K., Japan. From the data thus obtained, the storage modulus in torsion (E') at 150° C. was determined. [Reference may be made to "Polymer Blend" p. 110, CMC Shuppan, Japan (1984).]

(2) Impact Strength

A test piece having a length of 31.5 mm, width of 6.2 mm, and thickness of 3.2 mm was formed by injection molding, and its unnotched Izod impact strength was measured at 23° C. using Minimax Izod impact tester Model CS-138TI manufactured by Custom Scientific Co., according to JIS K-7110.

TABLE 5

| | Ex. 31 | Ex. 32 | Comp. Ex. 15 | Comp. Ex. 16 | Ex. 33 | Comp. Ex. 17 | Comp. Ex. 18 | Comp. Ex. 19 |
|---|---|---|---|---|---|---|---|---|
| Formulation (wt %) | | | | | | | | |
| OH-PPE-7 | — | 50 | — | — | 30 | — | — | — |
| OH-PPE-8 | 20 | — | — | — | — | — | — | — |
| PPE H30 | 20 | — | 50 | 70 | — | 30 | 100 | — |
| PPS T4P | 60 | 50 | 50 | 30 | 70 | 70 | — | 100 |
| Property | | | | | | | | |
| High-temperature modulus in torsion ($\times 10^9$) (dyn/cm$^2$) | 10.5 | 12.3 | 13.2 | 14.8 | 8.4 | 7.9 | 22.0 | 3.0 |
| Izod impact strength, unnotched (kg · cm/cm$^2$) | 17.5 | 18.4 | 10.4 | 6.3 | 23.0 | 15.0 | 3.6 | 24.8 |

While the invention has been described in detail and with reference to specific embodiments thereof, it will be apparent to one of ordinary skill in the art that various changes and modifications can be made thereto without departing from the spirit and scope of the invention as set forth herein.

What is claimed is:

1. A process for producing a hydroxy-substituted poly(phenylene ether) resin having a number-average polymerization degree of from 25 to 400 which comprises copolymerizing:
   (A) 1.5 to 8 mol % of a monomer selected from the group consisting of 2-(3-hydroxypropyl)-6-methylphenol, 2-(4-hydroxybutyl)-6-methylphenol, 2-(2,3-dihydroxypropyl)-6-methylphenol, 2-(3-hydroxy-2-methylpropyl)-6-methylphenol, and 2-(1-ethyl-2-hydroxyethyl)-6-methylphenol; and
   (B) 98.5 to 92 mol % of 2,6-dimethylphenol.

2. The process according to claim 1, wherein said monomer of (A) supplies a structural unit selected from the group consisting of:

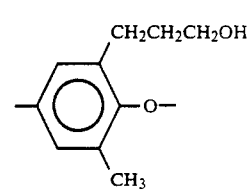
(a)

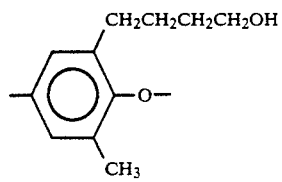
(b)

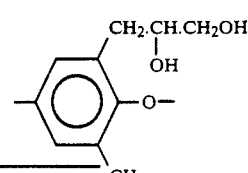
(c)

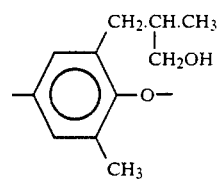
(d)

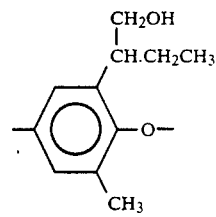
(e)

and said monomer (B) supplies a structural unit of the formula

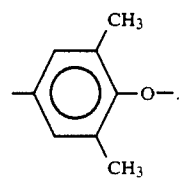
(f)

3. A hydroxyl-substituted poly(phenylene ether) resin prepared by the process of claim 1.

* * * * *